(12) United States Patent
Kretler (10) Patent No.: US 11,186,216 B2
(45) Date of Patent: Nov. 30, 2021

(54) CARGO HAULER FOR A PICKUP TRUCK

(71) Applicant: John M. Kretler, Avilla, IN (US)

(72) Inventor: John M. Kretler, Avilla, IN (US)

( * ) Notice: Subject to any disclaimer, the term of this patent is extended or adjusted under 35 U.S.C. 154(b) by 0 days.

(21) Appl. No.: 16/809,032

(22) Filed: Mar. 4, 2020

(65) Prior Publication Data

US 2020/0282892 A1 Sep. 10, 2020

Related U.S. Application Data

(60) Provisional application No. 62/815,014, filed on Mar. 7, 2019.

(51) Int. Cl.
| | | |
|---|---|---|
| *B60P 1/43* | (2006.01) | |
| *B60P 1/64* | (2006.01) | |
| *B60P 3/06* | (2006.01) | |
| *B60P 3/07* | (2006.01) | |

(52) U.S. Cl.
CPC ............. *B60P 1/433* (2013.01); *B60P 1/6454* (2013.01); *B60P 3/06* (2013.01); *B60P 3/07* (2013.01); *B60P 1/649* (2013.01)

(58) Field of Classification Search
CPC .......... B60P 1/14; B60P 1/433; B60P 1/6454; B60P 3/06; B60P 3/07
USPC .......................... 414/477, 480, 494, 500, 538
See application file for complete search history.

(56) References Cited

U.S. PATENT DOCUMENTS

| | | | |
|---|---|---|---|
| 4,274,788 A * | 6/1981 | Sutton .................. | B60P 3/1033 224/310 |
| 4,655,671 A | 4/1987 | Pratt | |
| 5,556,249 A | 9/1996 | Heine | |
| 5,603,600 A * | 2/1997 | Egan ...................... | B60P 3/1058 280/414.1 |
| 5,829,945 A * | 11/1998 | Stanley ................... | B60P 1/003 414/477 |
| 5,934,863 A | 8/1999 | Beck | |
| 6,089,816 A * | 7/2000 | Christ ..................... | B60P 3/122 414/500 |
| 6,099,232 A | 8/2000 | Dixon et al. | |

(Continued)

FOREIGN PATENT DOCUMENTS

EP 0039925 A1 * 11/1981 ................ B60P 1/04

OTHER PUBLICATIONS

"Cruiser Ramp Powered Motorcycle Ramp System—8' Long", Discount Ramps taken from www.discountramps.com/powered-motorcycle-ramp/p/C-Ramp/?_conv_eforce=100217284. 1002739059 (3 pages), Feb. 21, 2020.

(Continued)

*Primary Examiner* — James Keenan
(74) *Attorney, Agent, or Firm* — Taylor IP, P.C.

(57) ABSTRACT

A cargo hauler for hauling cargo that includes a rack assembly with a stationary frame and a tilting frame pivotally connected to the stationary frame, a rail assembly detachably connected to and extending rearwardly from the tilting frame, a carriage assembly including a carriage frame configured for supporting the cargo, and an actuating mechanism. The actuating mechanism is configured for tilting the tilting frame relative to the stationary frame, and for towing the carriage assembly from the ground over the rail assembly and onto to the tilting frame, and for lowering the carriage assembly from the tilting frame over the rail assembly and onto the ground.

15 Claims, 9 Drawing Sheets

(56) References Cited

U.S. PATENT DOCUMENTS

| | | | |
|---|---|---|---|
| 6,149,372 A | 11/2000 | Lee et al. | |
| 6,176,672 B1* | 1/2001 | Egan | B60P 3/122 |
| | | | 414/462 |
| 6,413,033 B1 | 7/2002 | Monroig, Jr. | |
| 6,524,056 B1 | 2/2003 | Kloster | |
| 6,695,565 B1* | 2/2004 | Franchuk | B60P 3/07 |
| | | | 414/462 |
| 6,705,820 B2* | 3/2004 | Schilling | B60P 3/122 |
| | | | 414/462 |
| 7,033,128 B2 | 4/2006 | Poindexter | |
| 7,997,850 B2* | 8/2011 | Hutchison | B60P 3/122 |
| | | | 414/478 |
| 9,987,963 B2* | 6/2018 | Verwys | B60P 1/43 |
| 2005/0111945 A1 | 5/2005 | Miller | |
| 2009/0025154 A1* | 1/2009 | Smith | B60P 1/431 |
| | | | 14/71.7 |
| 2009/0269176 A1* | 10/2009 | Smith | A61G 3/061 |
| | | | 414/480 |

OTHER PUBLICATIONS

"TripleD Motorcycle Lift and Loader" taken from Triple D Lift http://tripledloader.com/aboutUs.htm (1 page), Feb. 21, 2020.

"Toyloader" taken from www.toyloader.com/video/ (2 page), Feb. 21, 2020.

"E-Power Motorcycle Lift", taken from http://motorcycleliftsupply.com/e-power-motorcycle-lifts/ (5 pages), Feb. 21, 2020.

* cited by examiner

CARGO HAULER FOR A PICKUP TRUCK

CROSS REFERENCE TO RELATED APPLICATIONS

This is a non-provisional application based upon U.S. provisional patent application Ser. No. 62/815,014, entitled "TOY HAULER FOR A PICKUP TRUCK", filed Mar. 7, 2019, which is incorporated herein by reference.

BACKGROUND OF THE INVENTION

1. Field of the Invention

The present invention relates to an apparatus for loading, unloading, and hauling cargo in the bed of a pickup truck.

2. Description of the Related Art

Pickup trucks are used for hauling various types of cargo, such as lumber, drywall, hay, etc. Pickup trucks can also be used for hauling various types of small vehicles used for recreational purposes, commonly referred to as "toys", such as motorcycles, golf carts, all-terrain vehicles (ATVs), utility-terrain vehicles (UTVs), etc. Although the truck itself usually has a suspension suitable for hauling such toys, loading and unloading of a particular toy can be difficult. For example, a motorcycle can weigh between 300 to 900 pounds, a golf cart can weigh up to 1500 pounds, an ATV, such as a four-wheeler, can weigh up to 800 pounds, and a UTV, such as John Deere Gator® or Kawasaki Mule®, can weigh up to 2500 pounds.

Typically, portable ramps are used to load and unload the toy into and out of the bed of the pickup truck. Portable ramps are highly effective for loading and unloading four-wheeled vehicles, such as ATVs, but these ramps can be perilous when loading and unloading two-wheeled vehicles, such as motorcycles, given the inherent instability of a two-wheeled vehicle as it travels along a narrow ramp at low-speed. As can be appreciated, loading and unloading a motorcycle on a ramp can pose risks to both the vehicle and the operator.

What is needed in the art is a toy hauler for a pickup truck that allows various types of toys to be easily loaded and unloaded.

SUMMARY OF THE INVENTION

The present invention provides a cargo hauler for hauling cargo in a truck. The cargo hauler includes a rack assembly with a stationary frame and a tilting frame pivotally connected to the stationary frame, a rail assembly detachably connected to and extending rearwardly from the tilting frame, a carriage assembly including a carriage frame configured for supporting the cargo, and an actuating mechanism. The actuating mechanism is configured for tilting the tilting frame relative to the stationary frame, and for towing the carriage assembly from the ground over the rail assembly and onto to the tilting frame, and for lowering the carriage assembly from the tilting frame over the rail assembly and onto the ground.

The invention in one form is directed to a cargo hauler for hauling cargo in the bed of a pickup truck. The cargo hauler includes a rack assembly configured for being removably positioned within the truck. The rack assembly includes a stationary frame and a tilting frame pivotally connected to the stationary frame, the stationary frame includes a pair of side frame members each defining a pivot location, and the tilting frame is pivotally coupled to the stationary frame at each pivot location of each side frame member of the pair of side frame members. The cargo hauler also includes a rail assembly detachably connected to and extending rearwardly from the tilting frame, a carriage assembly including a carriage frame configured for supporting the cargo, and the carriage frame being engageable with the rail assembly and the tilting frame, and an actuating mechanism. The actuating mechanism is configured for tilting the tilting frame relative to the stationary frame, and for towing the carriage assembly from the ground over the rail assembly and onto to the tilting frame, and for lowering the carriage assembly from the tilting frame over the rail assembly and onto the ground.

The invention in another form is directed to a pickup truck. The pickup truck includes a chassis, a bed connected to the chassis, and a cargo hauler for hauling cargo. The cargo hauler includes a rack assembly removably positioned within the bed. The rack assembly includes a stationary frame and a tilting frame pivotally connected to the stationary frame, the stationary frame includes a pair of side frame members each defining a pivot location, and the tilting frame is pivotally coupled to the stationary frame at each pivot location of each side frame member of the pair of side frame members. The cargo hauler also includes a rail assembly detachably connected to and extending rearwardly from the tilting frame, a carriage assembly including a carriage frame configured for supporting the cargo, and the carriage frame being engageable with the rail assembly and the tilting frame, and an actuating mechanism. The actuating mechanism is configured for tilting the tilting frame relative to the stationary frame, and for towing the carriage assembly from the ground over the rail assembly and onto to the tilting frame, and for lowering the carriage assembly from the tilting frame over the rail assembly and onto the ground.

The invention in yet another form is directed to a method for hauling cargo in a pickup truck. The method includes an initial step of providing a cargo hauler for hauling cargo in a bed of the pickup truck. The cargo hauler includes a rack assembly configured for being removably positioned within the truck. The rack assembly includes a stationary frame and a tilting frame pivotally connected to the stationary frame, the stationary frame includes a pair of side frame members each defining a pivot location, and the tilting frame is pivotally coupled to the stationary frame at each pivot location of each side frame member of the pair of side frame members. The cargo hauler also includes a rail assembly detachably connected to and extending rearwardly from the tilting frame, a carriage assembly including a carriage frame configured for supporting the cargo, and the carriage frame being engageable with the rail assembly and the tilting frame, and an actuating mechanism. The method further includes the step of positioning the carriage assembly, by the actuating mechanism, in a horizontal loading position for loading the cargo. The method further includes the steps of loading the cargo onto the carriage frame of the carriage assembly and positioning the carriage assembly, by the actuating mechanism towing the carriage assembly, in an inclined position on the rail. The method further includes the step of positioning the carraige assembly, by the actuating mechanism, in a horizontal stowed position on the pickup truck.

An advantage of the cargo hauler of the present invention is that the actuating mechanism allows the carraige assembly, with the weight of the cargo thereon, to be moved independently of any unbalanced forces experienced by the carriage assembly as it is moved into and out of the bed of the truck.

Another advantage is of the cargo hauler of the present invention is that when the cargo is loaded into the truck the operator only needs to strap the cargo to the tie down points on the truck since the cargo is already strapped to the frame of the carriage assembly.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Referring now to the drawings, and more particularly to FIGS. 1-10, there is shown an embodiment of a cargo hauler 10 for a pickup truck 12, which generally includes a carriage assembly 14, a rail assembly 16, and a rack assembly 18 removably located within the truck bed of the truck 12. The cargo can be in the form of any desired cargo. For example, the cargo may be in the form of a small vehicle such as a toy, e.g. a motorcycle, golf cart, ATV, UTV, etc. Additionally, for example, the cargo could be some type of non-vehicle cargo, such as a pallet of material, etc. It should be appreciated that the truck 12 may be in the form of any desired vehicle with a chassis and a flat bed connected to the chassis.

Figure 1:
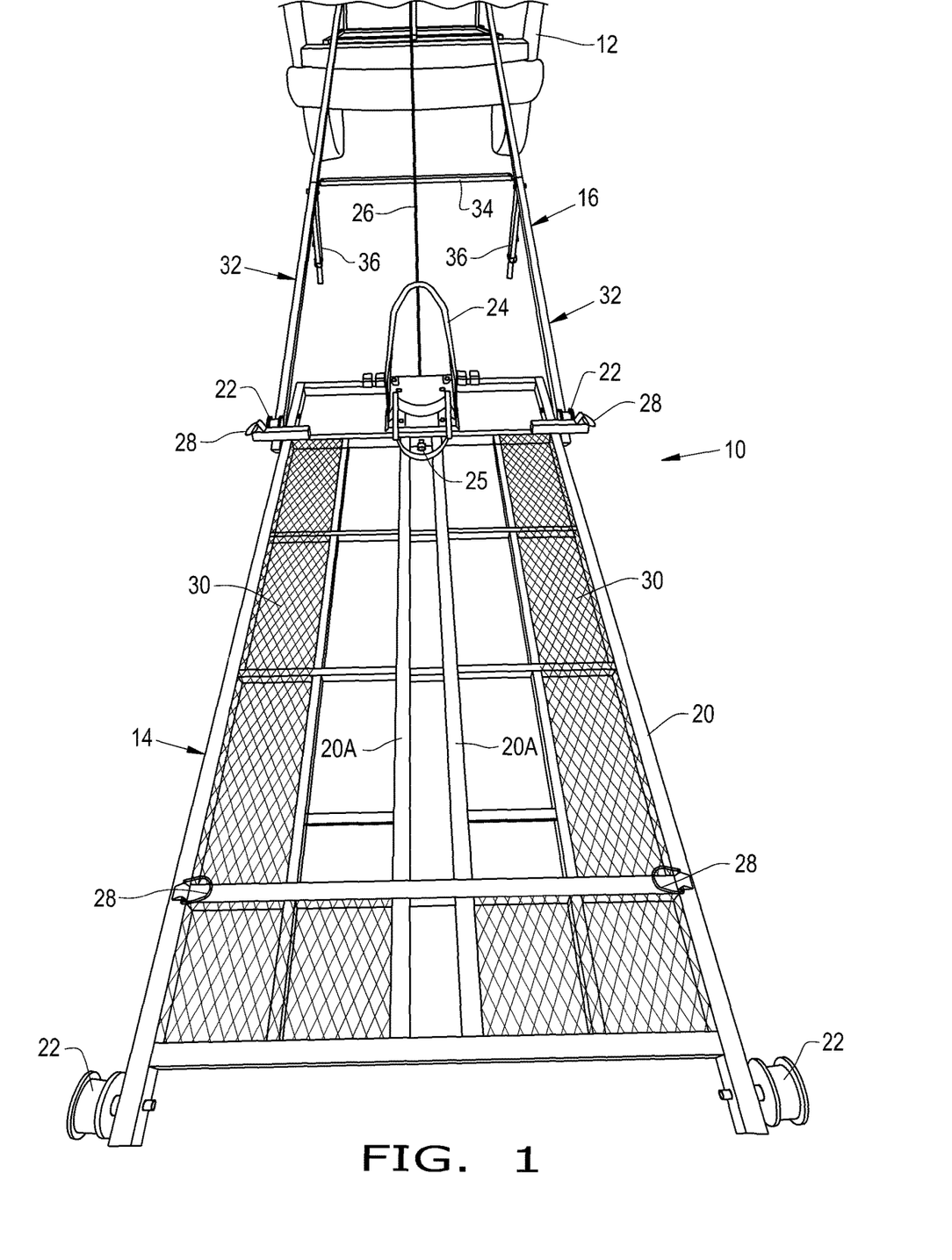
FIG. 1 is a perspective view of an exemplary embodiment of a cargo hauler for a pickup truck, the cargo hauler includes a carriage assembly, a rail assembly, and a rack assembly, and the carriage assembly is shown unloaded in an initial, horizontal loading position.
Figure 2:
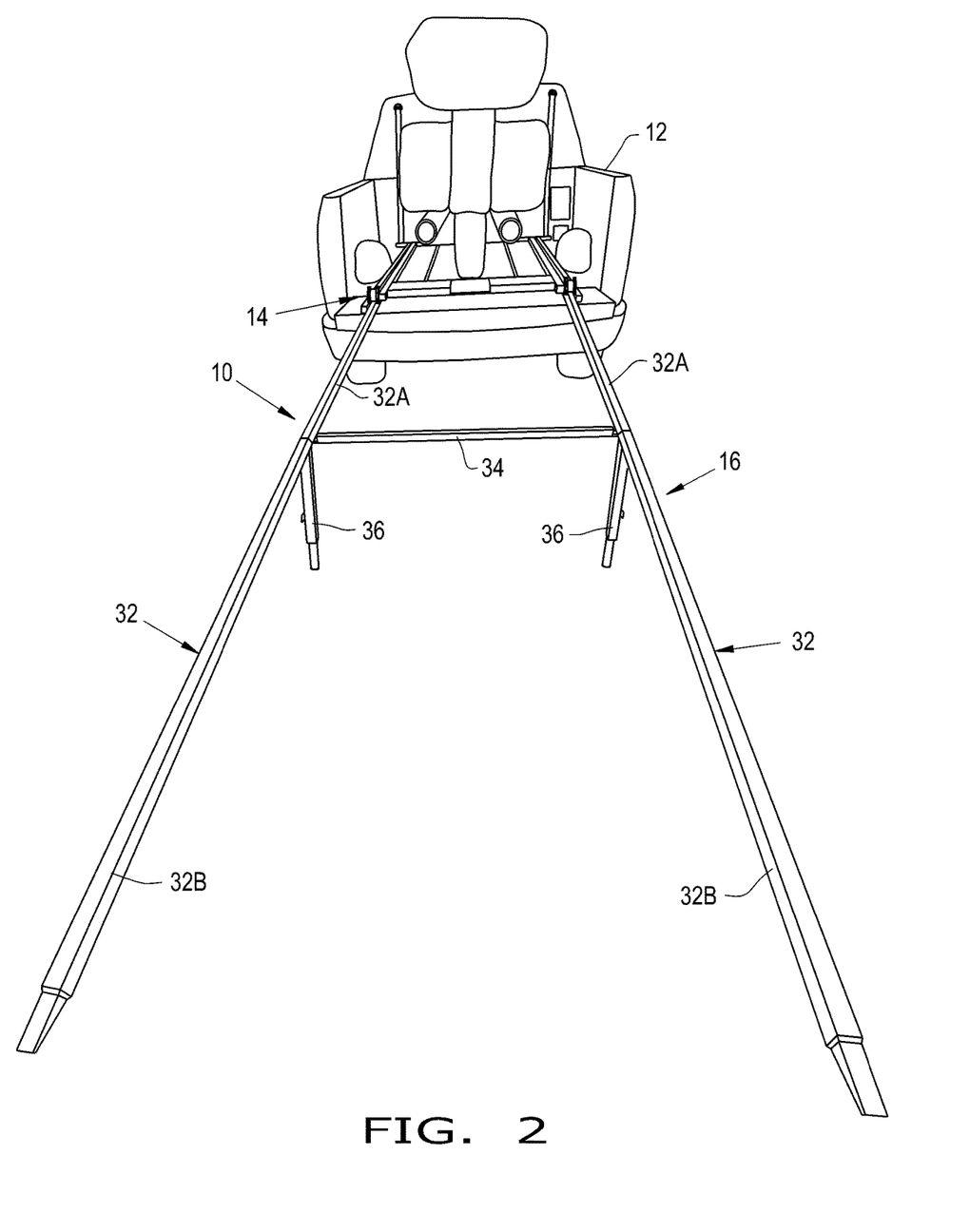
FIG. 2 is a perspective view of the cargo hauler with the carriage assembly positioned within the truck bed of the truck in a horizontal stowed position, and the carriage assembly is loaded with a two-wheeled vehicle.

The carriage assembly 14 includes a carriage frame 20 which is configured to carry the cargo. The carriage assembly 14 may be movable in between a horizontal loading position, i.e., extended on the ground (FIG. 1), an intermediate inclined position as it travels along the rail assembly 16, and a horizontal stowed position within the truck bed of the truck 12 independent of a center of gravity position of the cargo on the frame 20 (FIG. 2). Rollers 22 are rotatably mounted to each respective corner of the frame 20. The rollers 22 may engage with the ground, the rail assembly 16, and the rack assembly 18. Two center frame members 20A are spaced apart to guide the wheels of a motorcycle toward a wheel chock 24 mounted to the leading front end of the frame 20. The wheel chock 24 may be movably connected to the frame by a biased fastener 25, such as a spring-biased bolt 25. A cable 26 tows the carriage assembly 14 up the rail assembly 16 and onto the rack assembly 18, as will be described in more detail below. Tie downs 28, such as pivotable D-rings, allow the toy to be strapped down when in place on the carriage assembly 14. Optional mesh screen 30 can be used to allow passage of dirt and water, while at the same time allowing an operator to stand on the mesh screen 30 during loading and unloading of a toy onto the carriage assembly 14. The mesh screen 30 may also at least partially support the wheels of a four-wheeled vehicle. The frame 20 may be configured to support a load of up to 2500 pounds.

The rail assembly 16 is detachably connected to the rack assembly 18. The rail assembly 16 includes two side rails 32, at least one lateral support member 34, and at least one pair of vertically adjustable stands 36 connected to and extending downwardly from the side rails 32. Each side rail 32 can be configured as multiple shorter rail segments which can be easily fastened and unfastened together, and thus stowed in a disassembled state in the truck 12, for example under the cargo, during hauling of the cargo. For example, in the embodiment shown, each side rail 32 includes a pair of rail segments 32A and 32B which can be fastened together and to the rack assembly 18 with a tenon arrangement 37 and a fastener 38, such as a spring clip 38 (FIGS. 6-10). Each of the rear rail segments 32B can include a ramped surface at their rear or distal ends to allow the carriage assembly 14 to more easily engage with and climb onto the side rails 32 (FIG. 2).

Figure 6:
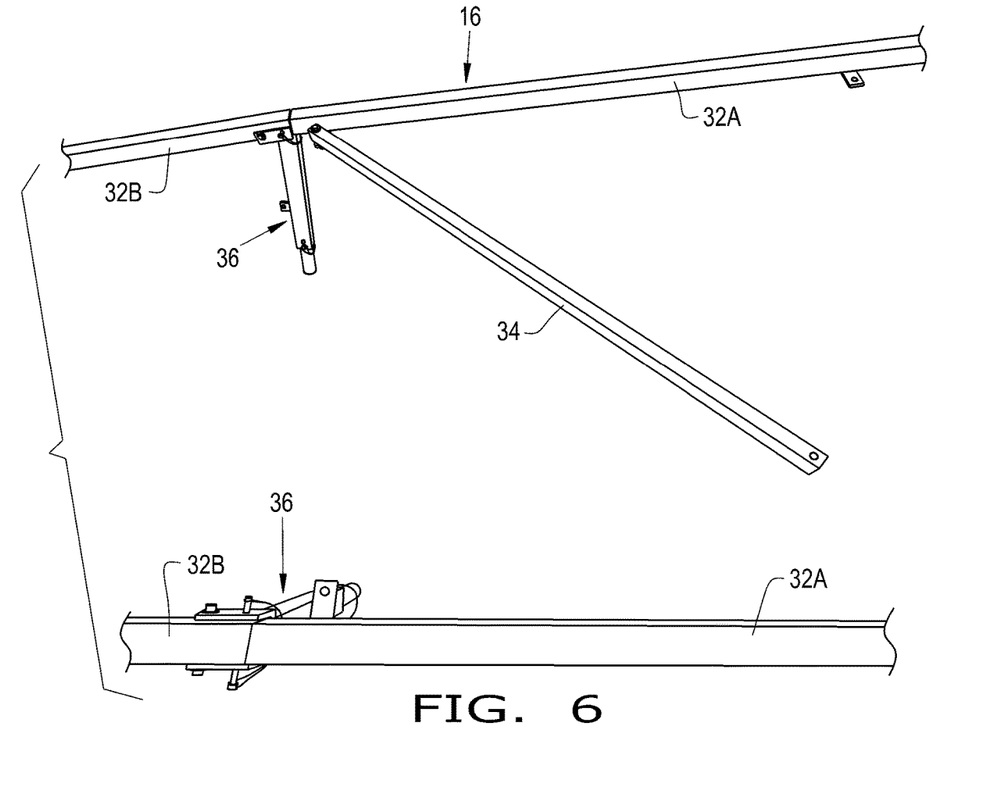
FIG. 6 is a perspective view of the rail assembly wherein the rail assembly is partially dissembled for stowing the rail assembly.
Figure 7:
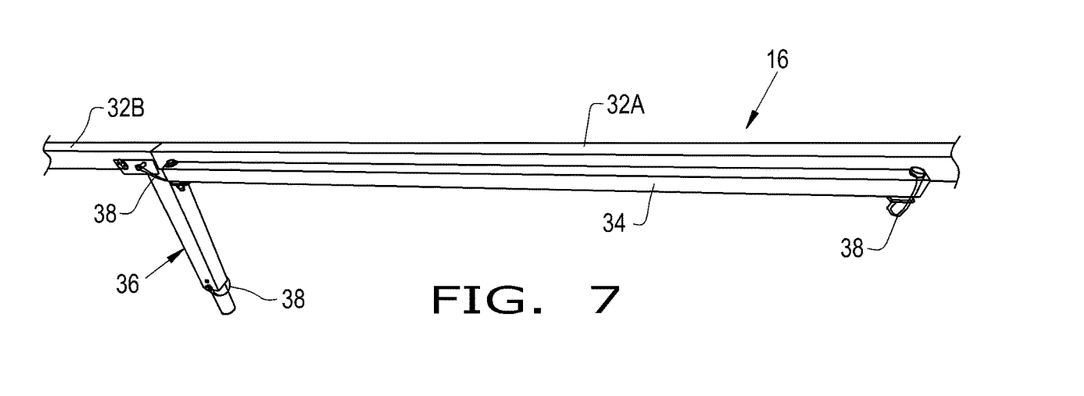
FIG. 7 is another perspective view of the rail assembly wherein the rail assembly is partially folded against itself for stowing the rail assembly.

The at least one lateral support 34 prevents the two side rails 32 from laterally moving relative to each other, when fastened in place therebetween. The lateral support 34 may be detachably and/or pivotally connected to the side rails 32. For instance, the lateral support 34 may be detachably connected to one side rail 32 and pivotally to the other side rail 32. Hence, the lateral support 34 may pivotally attach to one of the side rail segments 32A or 32B for convenient folding and stowing during transport or non-use (FIGS. 6-7). In the illustrated embodiment, a single lateral support 34 is positioned about half way along the length of the side rails 32; however, it may be convenient to use a different number of lateral supports, such as two lateral supports positioned each about a third of the way along the side rails 32.

Figure 8:
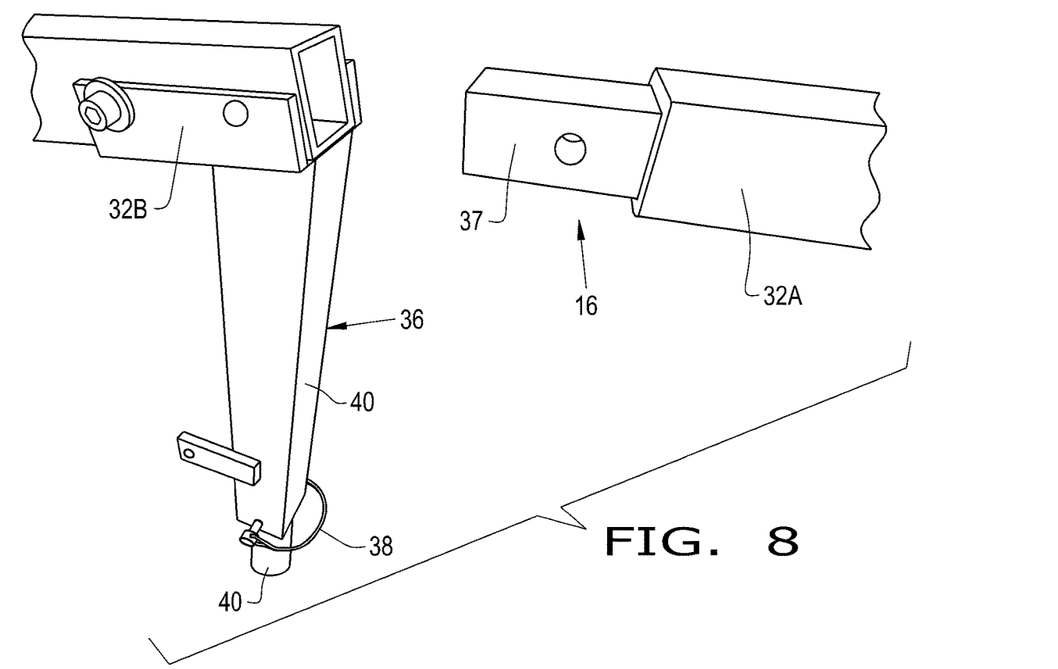
FIG. 8 is a side perspective view of the rail assembly wherein the stands of the rail assembly are folded for stowing the rail assembly.
Figure 9:
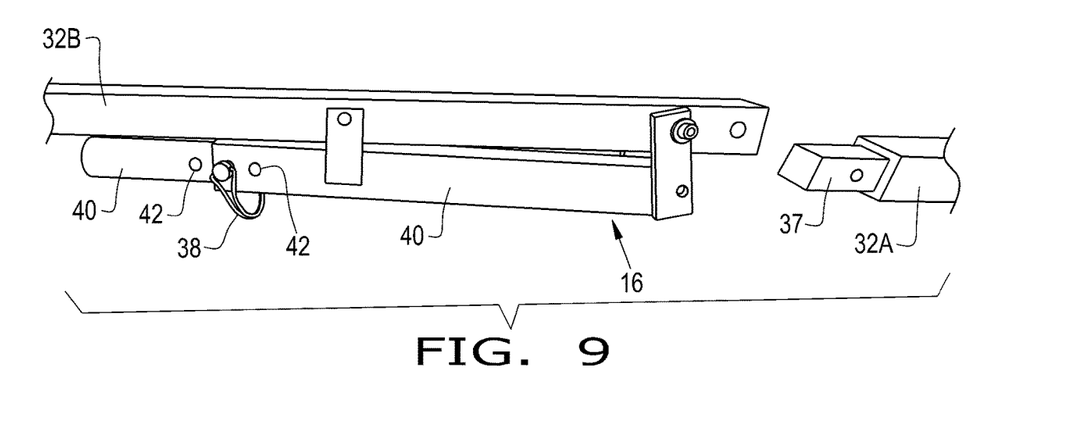
FIG. 9 is a side perspective view of the rail assembly wherein the side rails are dissembled for stowing the rail assembly.
Figure 10:
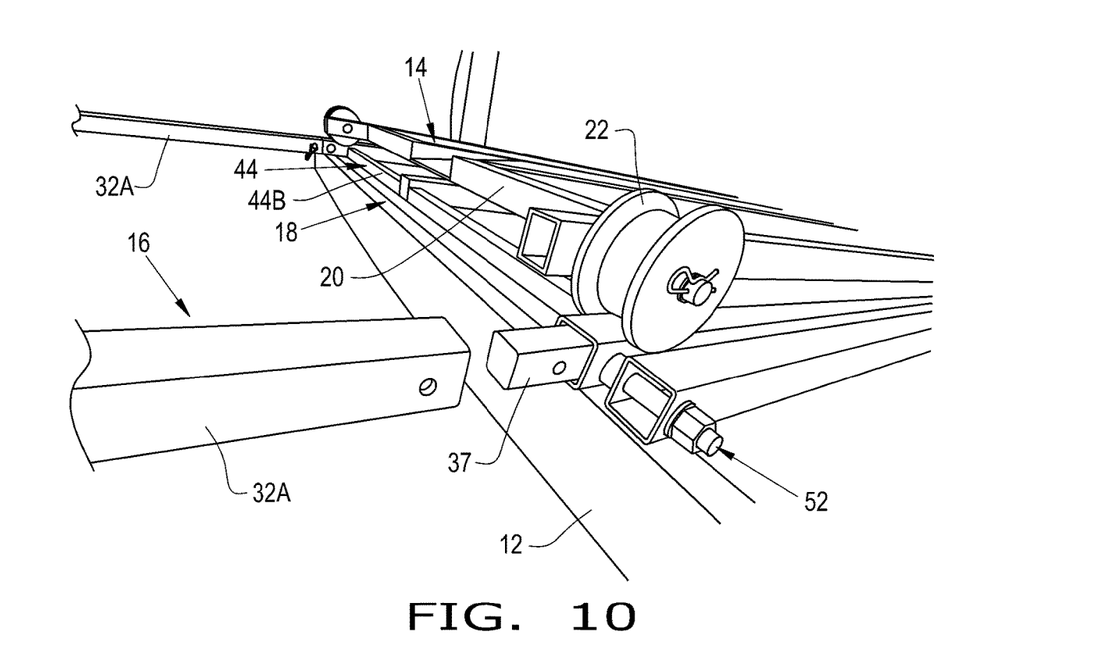
FIG. 10 is a perspective view of the cargo hauler wherein the rail assembly has been disconnected from the rack assembly.

The at least one pair of vertically adjustable stands 36 are positioned at about the same location along the length of the side rails 32 as the lateral support member 34. The stands 36 can be pivotally connected to the side rails 32 such that they are foldable relative to the side rails 32 (FIG. 8). Thereby, the entire rail assembly 16 is foldable and stowable in the truck 12 by way of the segmented side rails 32, the foldable later support member 34, and the foldable stands 36. Each stand 36 may be in the form of a telescoping stand 36. The telescoping stand 36 may include a pair of telescoping tubes 40 that have a number of corresponding through holes 42 for allowing the spring clip 38 to pass therethrough (FIG. 8). Hence, the operator may selectively adjust the vertical height of the telescoping stands 36. The stands 36 help support the weight of the cargo which is conveyed up the rail assembly 16. In the illustrated embodiment, a single pair of stands 36 are positioned about half way along the length of the side rails 32; however, it may be convenient to use a different number of stands 36, such as two pairs of stands 36 positioned each about a third of the way along the side rails 32.

Figure 3:
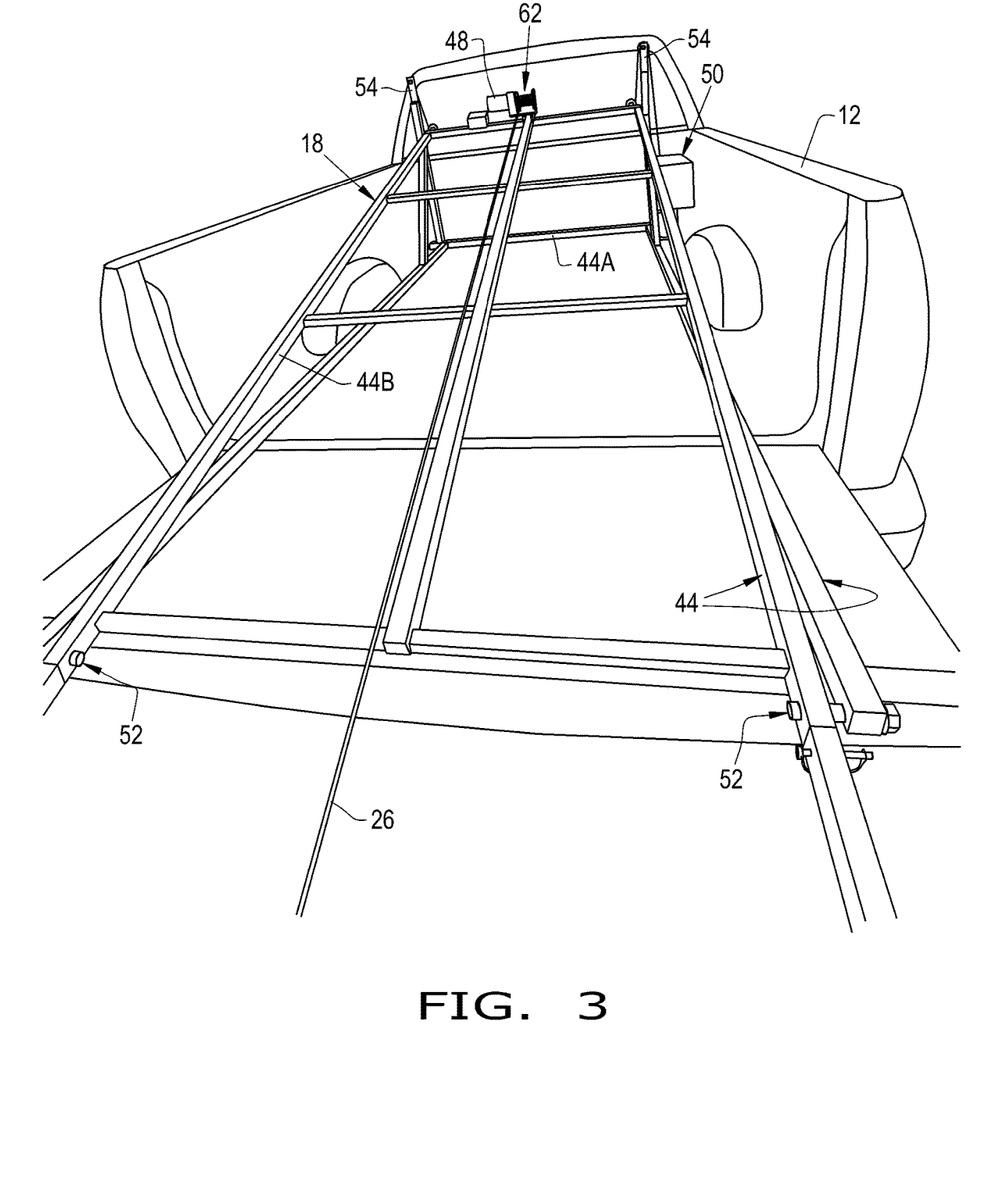
FIG. 3 is a perspective view of the rack assembly.
Figure 4:
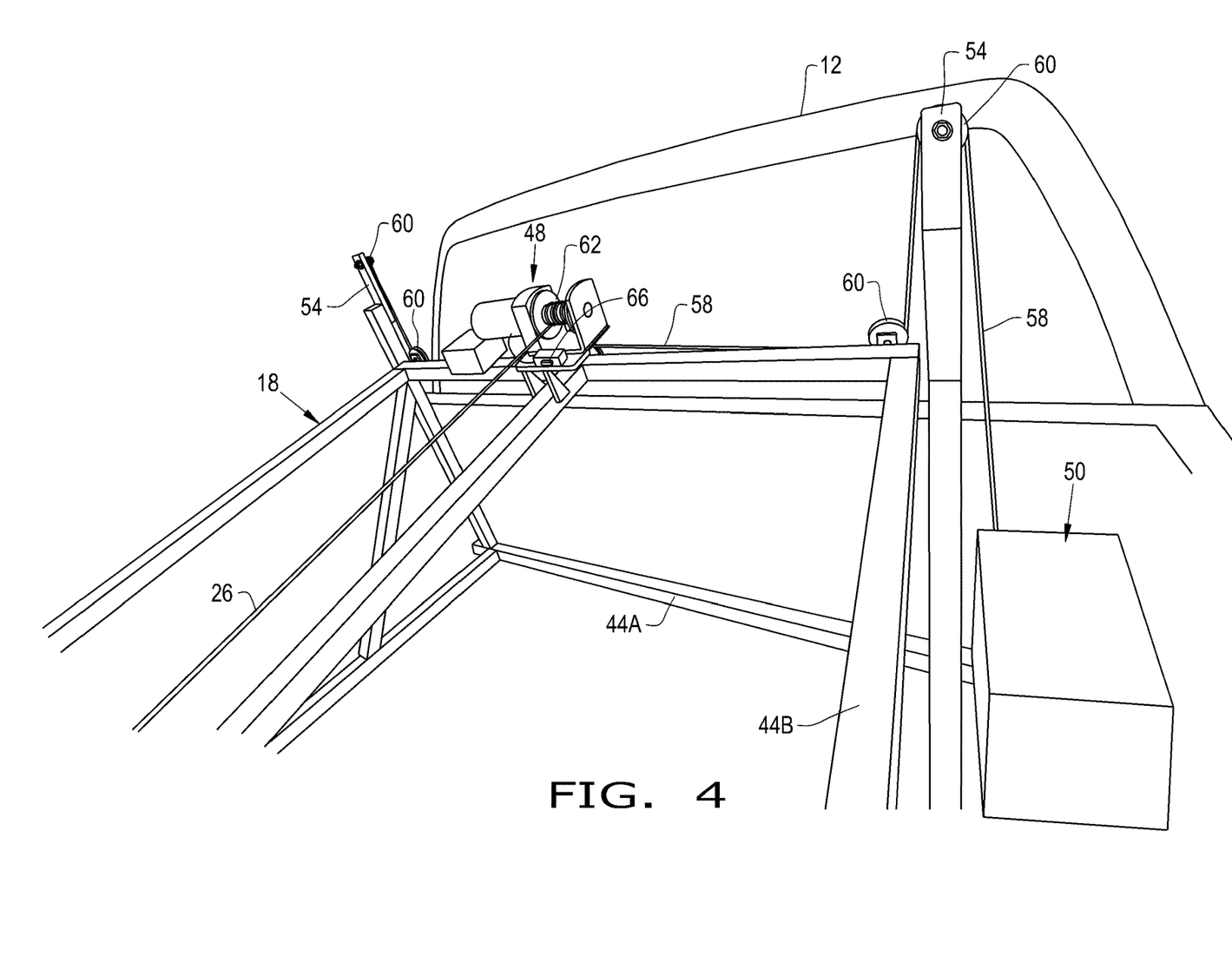
FIG. 4 is another perspective view of the rack assembly.
Figure 5:
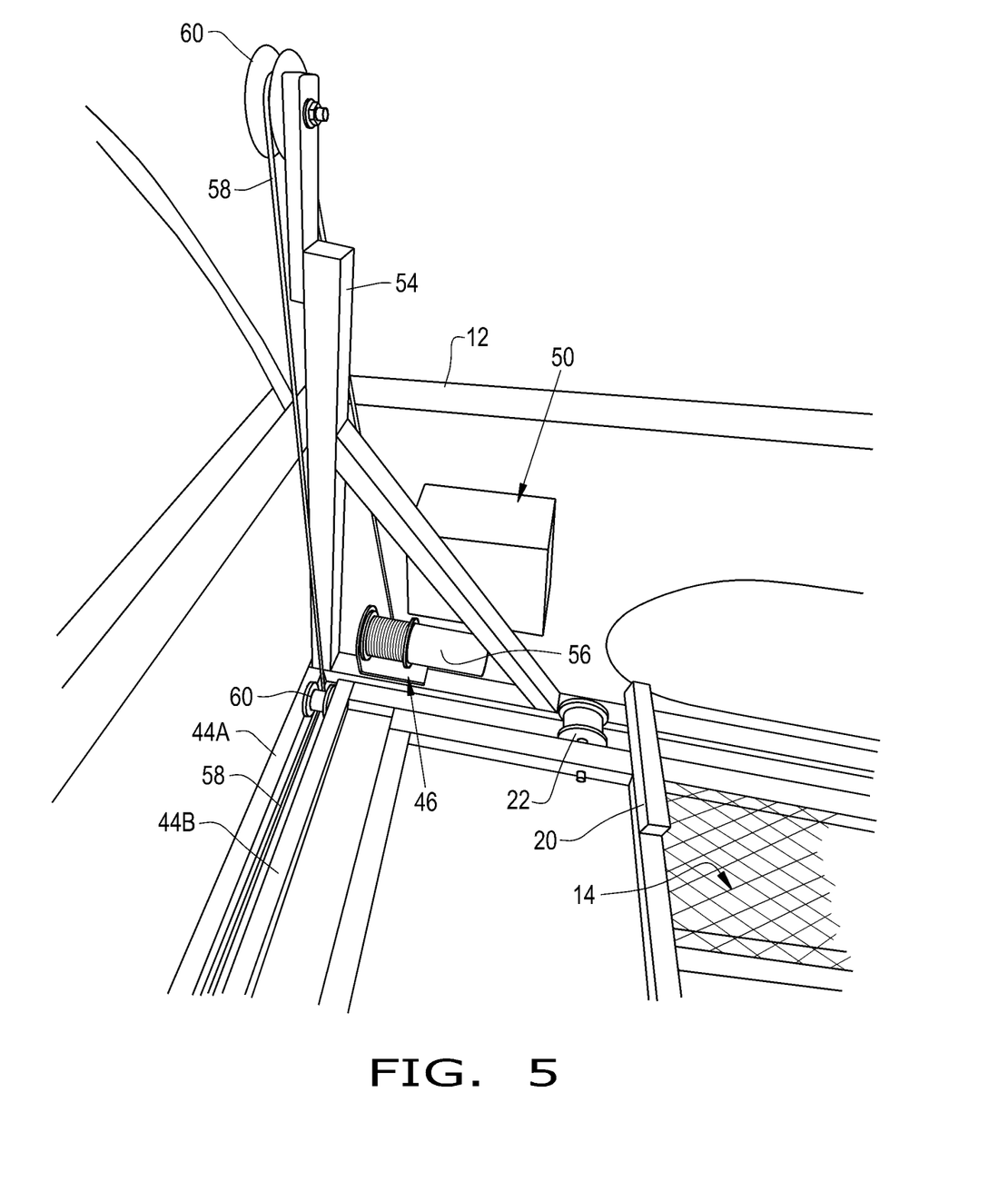
FIG. 5 is a side perspective view of a tilting lift arrangement of the rack assembly.

The rack assembly 18 is positioned in the bed of the truck 12. The rack assembly 18 generally includes a frame arrangement 44, an actuating mechanism 46, 48 moving the carriage assembly 14 and the frame arrangement 44, and a power supply 50 (FIGS. 3-5). The actuating mechanism 46, 48 may include a tilting lift winch arrangement 46 for moving the frame arrangement 44 and a tow winch arrangement 48 for moving the carriage assembly 14.

The frame arrangement 44 includes a stationary frame 44A and tilting frame 44B. The stationary frame 44A includes two side frame members with a length corresponding to the length of the truck bed (depending on the brand of truck, length of the bed, whether the tail gate will remain on the truck or be removed, etc.). The front end of the stationary frame 44A is positioned against the front wall of the truck bed, and the rear end of the stationary frame 44A extends just slightly rearwardly of the rear end of the truck 12, i.e., the end of the truck bed or tail gate (depending on whether the tail gate is on or off), to define a pair of respective pivot locations 52. Each pivot location 52 includes a bolt passing through holes in the rear ends of the stationary frame 44A and tilting frame 44B, to allow relative pivotal movement therebetween. The stationary frame 44A also includes a pair of upright frame members 54 respectively located at the front corners to allow lifting of the front end of the tilting frame 44B using the tilting lift winch arrangement 46. Hence, the tilting frame 44B may tilt up or down relative to the stationary frame 44A, via the tilting lift winch arrangement 46, about the pivot locations 52. The side rails 32 thus can pivot downwardly, in an assembled state, until they touch the ground at their rear ends.

The tilting lift winch arrangement 46 includes a tilting winch 56 with a cable 58 which passes over a number of pulleys 60 mounted to the stationary frame 44A and tilting frame 44B. Two of those pulleys 60 are respectively mounted to the top ends of the upright frame members 54. Depending on the selected height of the upright frame members 54, and thus the height of the pulleys 60 at their top ends, the tilting frame 44B can be tilted to different maximum heights. This variable (height of the upright frame members 54) can be dependent on the length of the truck bed, height of the rear end of the truck bed from the ground, etc. The tilting winch 56 can be conveniently mounted to the front, side of the stationary frame 44A, as shown, or located at some other location allowing the cable 58 to interact with the pulleys 60 providing the lifting and tilting motion of the tilting frame 44B. The tilting winch 56 receives power from the power supply 50. The tilting winch 56 may include a switch or sensor for sensing a position of the tilting frame 44B. Accordingly, the tilting winch 56 may automatically shut off upon the tilting frame 44B reaching the desired lowered position, as indicated by the switch or sensor.

The tow winch arrangement 48 includes a tow winch 62 which is mounted to the front end of the tilting frame 44B. The tow winch 62 likewise receives power from the power supply 50. The tow winch 62 includes the cable 26 which is attached to the front or leading front end of the frame 20 of the carriage assembly 14. The tow winch 62 may also optionally include a winch switch or sensor 66 for sensing a position of the carriage assembly 14. Based upon the sensed position of the switch or sensor 66, the tow winch 62 may automatically shut off when the frame 20 reaches a predetermined position. As shown, the tow winch 62 includes a mechanical switch 66 with a paddle or lever, or any other desired member, that is depressed upon being contacted by the frame 20, which then opens the circuit and cuts power to the tow winch 62. Thereby, once the frame 20 is sufficiently pulled up into the rack assembly 18, the frame 20 will contact the switch 66, and thereafter the tow winch 62 will automatically shut off to prevent any unwanted strain on the cable 26, the tow winch 62, and/or the frame 20. Alternatively, for example, the tow winch 62 may include a proximity sensor, such as an optical sensor, for indirectly sensing the position of the frame 20.

The tow winch 62 is used to tow the carriage 14 and cargo up onto the rail assembly 16 and rack assembly 18, or vice versa, to lower the carriage assembly 14 and cargo from the truck bed back down to the ground. After the cargo is towed onto the tilting frame 44B using the tow winch 62, the tilting winch 56 is then used to lower the tilting frame 44B relative to the stationary frame 44A. Thereby, the frame 20, with the weight of the cargo thereon, is secured by both winches 56, 62 which prevents the change in position of the center of gravity of the cargo, as it moved and tilted along the rail assembly 16 and the tilting frame 44B, from undesirably causing a movement of the frame 20. In other words, an unbalanced force of the cargo, as it rotates to and from the truck bed, does not destabilize the frame 20 since the frame 20 is stabilized and moved independently by the winches 56, 62. Since the cargo is already strapped to the frame 20 of the carriage assembly 14, it is only necessary to strap the cargo to the tie down points, e.g. hooks, in the side walls of the truck bed. Securing the cargo in this manner thus secures each of the rack assembly 18, carriage assembly 14 and cargo in the truck bed. Thus, it is not necessary to directly secure the rack assembly 18 to the bed of the truck 12, such as by using bolts, etc. An optional high friction surface in the truck bed, such as a slide in or spray on liner, can further assist with maintaining the entire unit in the truck bed.

The power supply 50 may be in the form of a battery 50, such as a 12V auto battery. The battery 50 may be located at any desired location on the cargo hauler 10 or truck 12. For example, the battery 50 may be carried by the stationary frame 44A. Power could be derived from a different source, such as by using a pigtail to plug into a trailer pigtail connector located in the sidewall of the truck bed. As can be appreciated, using the onboard power from the truck 12, rather than using a battery, would reduce the weight and cost of the rack assembly 18.

To unload cargo from the truck bed, the side rails 32, lateral support member 34 and stands 36 are assembled to the tilting frame 44B. Then, the tilting frame 44B is lifted and pivoted using the tilting winch 56 until the stands 36 and distal ends of the side rails 32 touch the ground. Thereafter, the tow winch 62 is used to lower the carriage assembly 14 down the side rails 32 and onto the ground. The operator may then unfasten the cargo and remove the cargo from the carriage assembly 14. When not in use, the cargo hauler 10 of the present invention can simply be removed from the truck bed, and stood upright against a wall to occupy little space during storage.

It should be appreciated that the operation of the winches 56, 62 may be manually controlled by the operator and/or automatically controller by an electrical processing circuit, such as a controller with a memory. For example, each winch 56, 62 may have an ON/OFF switch that is manually actuated by the operator. Additionally or alternatively, each winch 56, 62 may be operably connected to a remote switch and/or controller via a wired or wireless connection. For instance, the winches 56, 62 may be operably connected to a handheld remote-control switch, which allows the user to (de)activate the winches 56, 62 for (un)loading the cargo upon inputting a corresponding user command.

Figure 11:
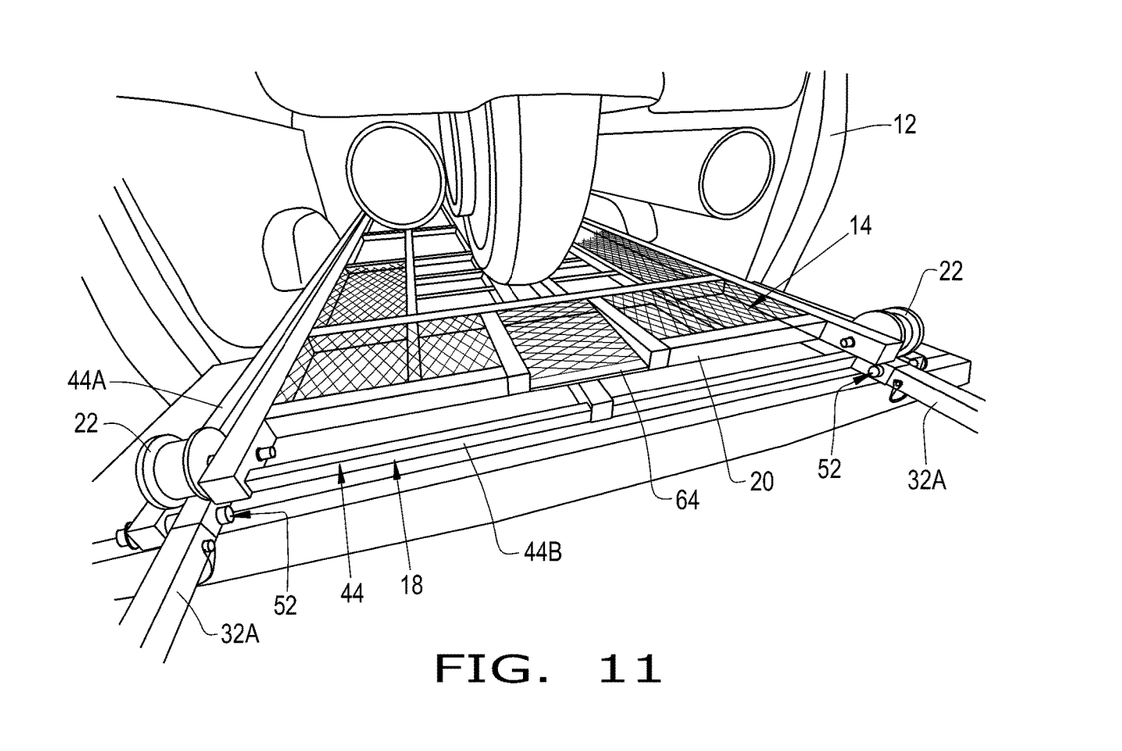
FIG. 11 is a perspective view of another embodiment of a carriage assembly of the cargo hauler.

Referring now specifically to FIG. 11, there is shown an optional ramped surface 64 at the rear of the carriage assembly 14, which is positioned within the truck bed in its stowed position. The ramped surface 62 allows a motorcycle to be more easily loaded onto the carriage assembly 14. As shown in FIG. 11, the cargo is in the form of a motorcycle.

Figure 12:
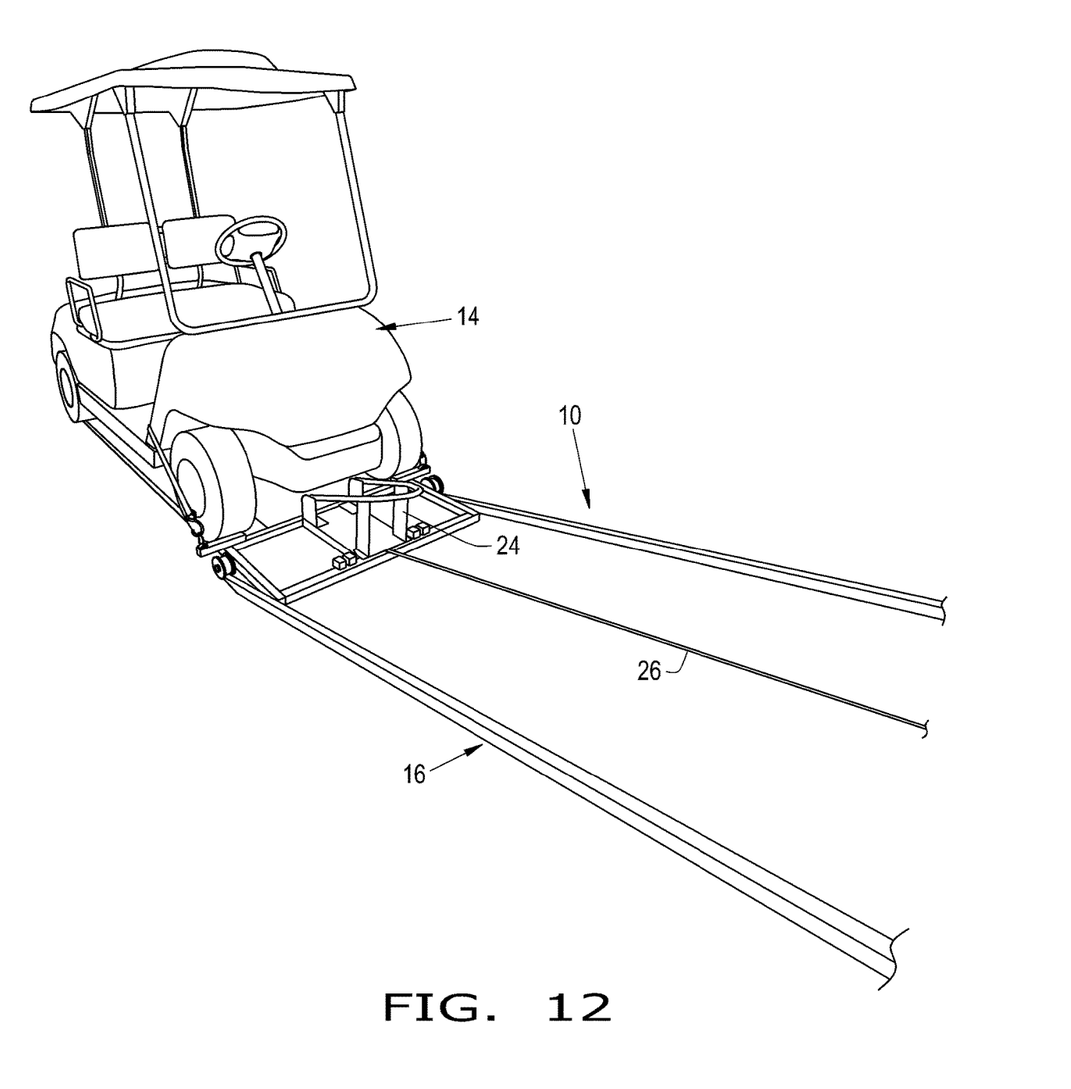
FIG. 12 is a perspective view of the cargo hauler in the horizontal loading position, and the carriage assembly is loaded with a four-wheeled vehicle.

Referring now specifically to FIG. 12, there is shown another perspective view of the cargo hauler 10, in its horizontal loading position, wherein the carriage assembly 14 is carrying a four-wheeled vehicle. As shown, the cargo is in the form of a golf cart. The wheels of the golf cart may rest on top of the mesh screen 30 of the frame 20. The front of the golf cart may abut against the wheel chock 24.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cargo hauler for hauling cargo in the bed of a pickup truck, comprising:
a rack assembly configured for being removably positioned within the pickup truck, the rack assembly including a stationary frame and a tilting frame pivotally connected to the stationary frame, the stationary frame including a pair of side frame members each defining a pivot location, and the tilting frame being pivotally coupled to the stationary frame at each pivot location of each side frame member of the pair of side frame members;
a rail assembly detachably connected to and extending rearwardly from the tilting frame;
a carriage assembly including a carriage frame configured for supporting the cargo, and the carriage frame being engageable with the rail assembly and the tilting frame; and
an actuating mechanism configured for tilting the tilting frame relative to the stationary frame, and for towing the carriage assembly from the ground over the rail assembly and onto to the tilting frame, and for lowering the carriage assembly from the tilting frame over the rail assembly and onto the ground, wherein the rail assembly includes side rails, at least one lateral support member connected in between the side rails, and at least one pair of stands connected to and extending downwardly from the side rails for engaging the ground and supporting the rail assembly and wherein each side rail is removably connected to the tilting frame with a tenon arrangement and a fastener.

2. The cargo hauler of claim 1, wherein the actuating mechanism includes a tilting lift winch arrangement for moving the tilting frame and a tow winch arrangement for moving the carriage assembly such that the carriage assembly is movable between a horizontal loading position, an inclined position on the rail assembly, and a horizontal stowed position on the pickup truck independent of a center of gravity position of the cargo on the carriage frame of the carriage assembly.

3. The cargo hauler of claim 2, wherein the tow winch arrangement includes a tow winch mounted on the tilting frame with a cable connected to the carriage frame of the carriage assembly.

4. The cargo hauler of claim 2, wherein the tilting lift winch arrangement includes a tilting winch mounted on the stationary frame with a cable connected to the tilting frame.

5. The cargo hauler of claim 4, wherein the stationary frame further includes a pair of upright frame members respectively connected to the pair of side frame members, and the cargo hauler further includes a plurality of pulleys mounted to the pair of upright frame members and the tilting frame, and the cable passes over the plurality of pulleys between the pair of upright frame members and the tilting frame for tilting the tilting frame relative to the stationary frame.

6. The cargo hauler of claim 1, wherein the pickup truck includes a rear end, and each side frame member of the pair of side frame members has a rear end which extends outwardly beyond the rear end of the pickup truck and defines the pivot location such that the pivot location of each side frame member of the pair of side frame members is located rearwardly of the rear end of the pickup truck.

7. The cargo hauler of claim 1, wherein the rail assembly is configured for being assembled for loading the cargo and disassembled for hauling the cargo, the at least one lateral support member is pivotally connected to one side rail and removably connected to the other side rail, and the at least one pair of stands is pivotally connected to the side rails such that the rail assembly is foldable and stowable in the pickup truck.

8. The cargo hauler of claim 1, wherein the carriage assembly further includes four rollers rotatably connected to each corner of the carriage frame.

9. A pickup truck, comprising:
a chassis;
a bed connected to the chassis; and
a cargo hauler for hauling cargo, comprising:
a rack assembly removably positioned within the bed, the rack assembly including a stationary frame and a tilting frame pivotally connected to the stationary frame, the stationary frame including a pair of side frame members each defining a pivot location, and the tilting frame being pivotally coupled to the stationary frame at each pivot location of each side frame member of the pair of side frame members;
a rail assembly detachably connected to and extending rearwardly from the tilting frame;
a carriage assembly including a carriage frame configured for supporting the cargo, and the carriage frame being engageable with the rail assembly and the tilting frame; and
an actuating mechanism configured for tilting the tilting frame relative to the stationary frame, and for towing the carriage assembly from the ground over the rail assembly and onto to the tilting frame, and for lowering the carriage assembly from the tilting frame over the rail assembly and onto the ground, wherein the rail assembly includes side rails, at least one lateral support member connected in between the side rails, and at least one pair of stands connected to and extending downwardly from the side rails for engaging the ground and supporting the rail assembly and wherein each side rail is removably connected to the tilting frame with a tenon arrangement and a fastener.

10. The pickup truck of claim 9, wherein the actuating mechanism includes a tilting lift winch arrangement for moving the tilting frame and a tow winch arrangement for moving the carriage assembly such that the carriage assembly is movable between a horizontal loading position, an inclined position on the rail assembly, and a horizontal stowed position on the pickup truck independent of a center of gravity position of the cargo on the carriage frame of the carriage assembly.

11. The pickup truck of claim 10, wherein the tow winch arrangement includes a tow winch mounted on the tilting frame with a cable connected to the carriage frame of the carriage assembly.

12. The pickup truck of claim 10, wherein the tilting lift winch arrangement includes a tilting winch mounted on the stationary frame with a cable connected to the tilting frame.

13. The pickup truck of claim 12, wherein the stationary frame further includes a pair of upright frame members respectively connected to the pair of side frame members, and the cargo hauler further includes a plurality of pulleys mounted to the pair of upright frame members and the tilting frame, and the cable passes over the plurality of pulleys between the pair of upright frame members and the tilting frame for tilting the tilting frame relative to the stationary frame.

14. The pickup truck of claim 9, wherein the pickup truck further includes a rear end, and each side frame member of the pair of side frame members has a rear end which extends outwardly beyond the rear end of the pickup truck and defines the pivot location such that the pivot location of each side frame member of the pair of side frame members is located rearwardly of the rear end of the pickup truck.

15. The pickup truck of claim 9, wherein the rail assembly is configured for being assembled for loading the cargo and disassembled for hauling the cargo, the at least one lateral support member is pivotally connected to one side rail and removably connected to the other side rail, and the at least one pair of stands is pivotally connected to the side rails such that the rail assembly is foldable and stowable in the pickup truck.

* * * * *